C. B. CLARK.
Mop-Heads.
No. 155,494.                                   Patented Sept. 29, 1874.
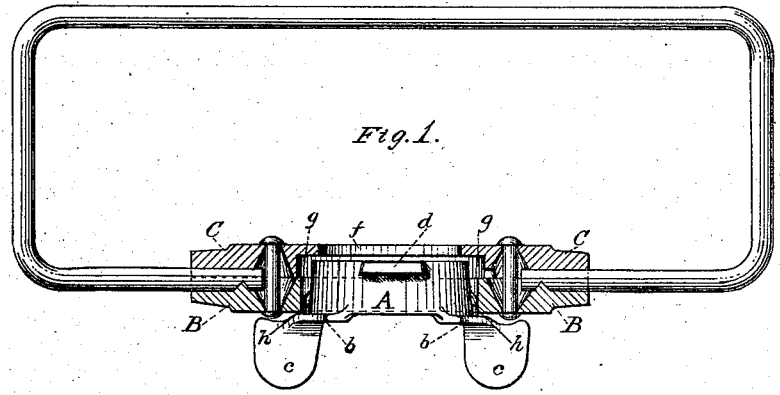
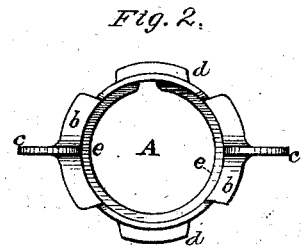
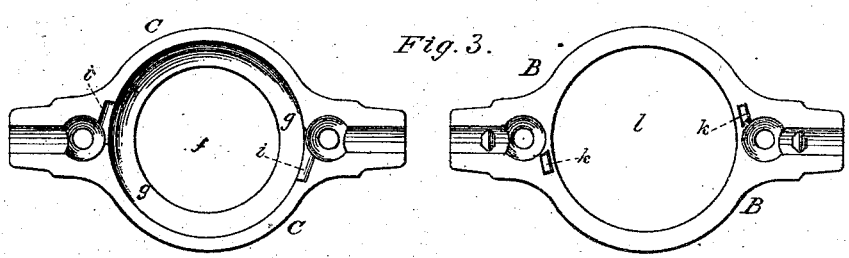
Witnesses:                                     Inventor:
Arthur C. Fraser.                              Charles B. Clark.
Charles M. Higgins.                            Per Burke & Fraser.
                                                        Atty's

UNITED STATES PATENT OFFICE.

CHARLES B. CLARK, OF BUFFALO, NEW YORK.

IMPROVEMENT IN MOP-HEADS.

Specification forming part of Letters Patent No. 155,494, dated September 29, 1874; application filed June 1, 1874.

*To all whom it may concern:*

Be it known that I, CHARLES B. CLARK, of Buffalo, in the county of Erie and State of New York, have invented certain new and useful Improvements in Mop-Heads, of which the following is a specification:

This invention relates to that class of mop-heads which are provided with a traversing-collar bisected flatwise, to which the sliding clamping-wire is secured, and in which the nut which engages with the teeth on the shank turns, patents for which were granted me July 9, 1872, and December 9, 1873, and its object is to simplify the form of the nut and collar, so that the same may be more readily molded and cast.

The improvements are fully hereinafter described and pointed out in the claim.

Figure 1 of the accompanying drawings is an elevation of the collar, wire-jaw, and nut in position, the collar appearing in section. Fig. 2 is a plan view of the nut; and Fig. 3 is a plan view of the proximate faces of each half of the collar.

As shown in the drawings, A is the nut, which, as usual, is of the form of a hollow cylinder. Upon its lower or outer end are formed two lugs, $b\ b$, or portions of a circular radial flange which are arranged diametrically opposite each other, and project radially from the cylindrical sides of the nut, as shown in Figs. 1 and 2. At the center, preferably, of these flanges are formed the thumb-pieces $c\ c$, by which the nut is turned. Upon the opposite or inner end of the nut are formed two other similar lugs, $d\ d$, which are placed at right angles to the lugs $b\ b$, and are somewhat narrower than them, as shown. Upon the interior of the nut the inclined feather or thread $e$ is formed in the usual manner and position, as seen in Fig. 2. One of the lugs $d\ d$ is of less projection than the other, as shown in Fig. 2, and the nut is less in diameter than the aperture of the collar, as seen in Fig. 1, the purpose of which is to allow the ready insertion of the nut into the socket of the collar. Small guides $h\ h$, Fig. 1, are formed on each side of the nut at the outer flanges $b\ b$, which rest against the sides of the aperture of the collar and steady the nut. The nut so formed is placed flatwise in the flask in molding, and is cast without a core, which effects an important saving in the cost of manufacture.

The collar is formed differently from that described in my previous patents (except as to its connection with the wire-jaw) to adapt it to the improved form of nut, as will be now described. The aperture $f$ in the half C of the collar is large enough only to admit of the free passage of the shank, and surrounding the aperture upon the under or inner side, as seen in Fig. 1, is formed a deep groove or recess, $g\ g$, Figs. 1 and 3. The half B is formed without an annular groove, and its aperture $l$ is larger than that of the half C, so as to freely admit the nut, but somewhat less than the recess $g$, so that when the two halves of the collar are secured together, an annular seat is formed between them, as shown in Fig. 1, in which the lugs $d\ d$ of the nut work, and by which it is held in place. The outer lugs or flanges $b\ b$ of the nut rest against the outer face of the half B of the collar, as seen in Fig. 1, and steady the nut in its rotary motion, and also give it additional strength.

The collar thus formed is much simpler than that described in my previous patents, where an annular groove was formed on each face of both halves, in that my present improvement dispenses with these grooves and forms a collar much more readily molded and of neater form.

Upon each end of the inner face of the half B of the collar nibs or projections $k\ k$ are formed, and in like position upon the other half C are formed corresponding indentations $i\ i$, into which the nibs project when the halves are placed together. By this means the halves are prevented moving freely upon each other, and are held in true relative position, forming a guide for the putting together of the parts.

Having now described the nature of my invention, what I claim, and desire to secure by Letters Patent, is as follows:

The mop-head herein described, in which the bisected collar is formed with an annular groove or recess intervening between said bisected portions, in combination with the nut having lateral flanges $b\ b$ and $d\ d$, the diameter through such nut and flanges being greater than the diameter of the opening in the section B, and less than the opening in the section C, so that the flanges of the nut can be inserted into the groove through the opening in section B, and the nut confined in place for operation, substantially as described.

In testimony whereof I have hereunto signed my name in the presence of two subscribing witnesses.

CHARLES B. CLARK.

Witnesses:
H. R. CLARK,
WM. W. CLARK.